UNITED STATES PATENT OFFICE.

EDWARD CULMANN, OF BUFFALO, NEW YORK, ASSIGNOR TO SCHOELL-KOPF, HARTFORD & HANNA COMPANY, OF BUFFALO, NEW YORK.

DARK SULFUR DYE AND METHOD OF MAKING SAME.

SPECIFICATION forming part of Letters Patent No. 711,038, dated October 14, 1902.

Application filed February 25, 1902. Serial No. 95,592. (No specimens.)

*To all whom it may concern:*

Be it known that I, EDWARD CULMANN, a citizen of the Swiss Republic, and a resident of Buffalo, in the county of Erie and State of New York, have invented a new and useful Improvement in Dark Sulfur Dyes and Methods of Making Same, of which the following is a specification.

I have found that by treating dinitro salicylic acid with sulfur and sodium sulfid under suitable conditions a black coloring-matter is obtained which dyes cotton in a bath containing sodium sulfid deep-black shades. If a condensing agent is added to the melt—for instance, zinc chlorid—the black shades so obtained have a bluish tinge.

The dinitro salicylic acid may be prepared by Huebner's method (*Liebig's Annalen der Chemie*, 195, page 45) or by the treatment of the solution of salicylic acid in sulfuric acid with two molecules of nitric acid.

Example: Two hundred pounds of sodium sulfid and seventy pounds of sulfur are heated to 120° C. Then during constant stirring a mixture of sixty pounds of dinitro salicylic acid with four pounds of sodium carbonate and thirty pounds of water is added. The temperature is then raised to 150° C. and held at this temperature until the reaction is over. The temperature is then increased and held at about 180° C. for about two hours. The product so obtained is now ready for application.

The product can be purified by precipitating an aqueous solution of the same with muriatic acid, filtering, and mixing the precipitate with an alkaline sulfid dissolved in hot water. This solution is again filtered and the dyestuff salted out in the usual way, pressed, dried, and pulverized. The purification of the melt can also be effected by dissolving it in water and causing a current of air to pass through the solution until the dyestuff is completely precipitated, then filtering and drying.

The herein-described new sulfur dyestuff can also be obtained by boiling a dilute solution of dinitro salicylic acid together with the other ingredients.

Example: Thirty-five pounds of dinitro salicylic acid, one hundred pounds of a solution of sodium carbonate of about ten-per-cent. strength, one hundred and twenty-five pounds of sodium sulfid, forty-five pounds of sulfur, and fifty pounds of water are boiled for about twenty-four hours. The dyestuff is then separated from the solution by first diluting the same with water and then causing a current of air to pass through the solution until the precipitation is complete.

The new dyestuff is a blue-black solid matter and dyes deep-black shades on cotton in a bath containing alkaline sulfids. In solutions of caustic soda or sodium sulfid it dissolves with a bluish-green color. With concentrated sulfuric acid it forms an emulsion of a dull dark-violet color.

I claim as my invention—

1. The herein-described dyestuff, resulting from the reaction of sulfur and sodium sulfid upon dinitro salicylic acid, the same being a blue-black substance, dissolving in solutions of caustic soda or sodium sulfid with a bluish-green color, forming with concentrated sulfuric acid an emulsion of a dull dark-violet color, and dyeing cotton in a bath containing alkaline sulfids deep-black shades.

2. The herein-described method of producing a dark dye, which consists in treating dinitro salicylic acid with sulfur and sodium sulfid, substantially as set forth.

Witness my hand this 20th day of February, 1902.

EDWARD CULMANN.

Witnesses:
JNO. J. BONNER,
C. B. HORNBECK.